(No Model.)

H. W. LEAVITT.
CULTIVATOR.

No. 515,592.  Patented Feb. 27, 1894.

ATTEST
Helen Graham
William Graham

INVENTOR
H. W. LEAVITT.
by his attorney
L. P. Graham

UNITED STATES PATENT OFFICE.

HARRY W. LEAVITT, OF HAMMOND, ILLINOIS.

CULTIVATOR.

SPECIFICATION forming part of Letters Patent No. 515,592, dated February 27, 1894.

Application filed October 2, 1893. Serial No. 486,950. (No model.)

*To all whom it may concern:*

Be it known that I, HARRY W. LEAVITT, of Hammond, in the county of Piatt and State of Illinois, have invented certain new and useful Improvements in Cultivators, of which the following is a specification.

This invention relates to straddle row cultivators adapted to surface cultivation, or cultivation that will clean the field of weeds and pulverize and mulch the soil without cutting away the roots of the crop. The different features are embodied in a complete cultivator, but they are also capable of use as attachments to cultivators in common use. They comprise novel cultivating plows, novel levelers which also assist in pulverizing the soil and distribute the cuttings of the plows in a manner to form a mulch, and an arch connection for the rear ends of the beams of the cultivator; the plows being adapted to take the place of deep cultivation shovels, and the other features being capable of attachment to the beams and shanks of cultivators as ordinarily made.

Figure 1:
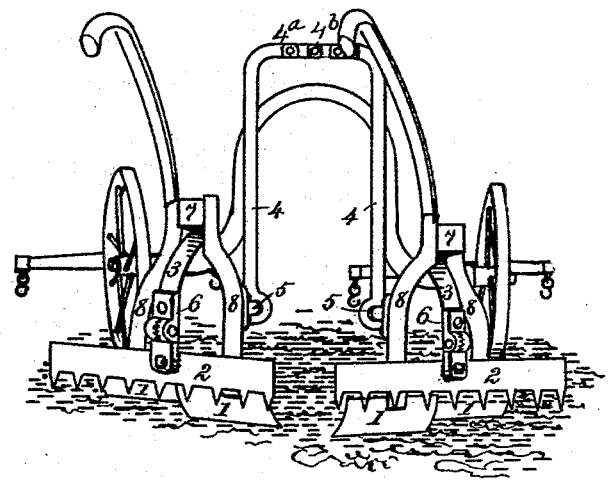
Figure 3:
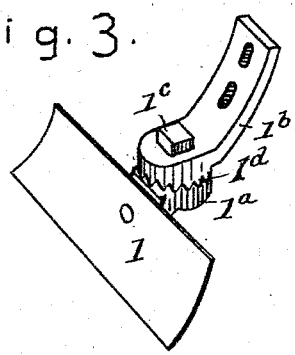
Figure 4:
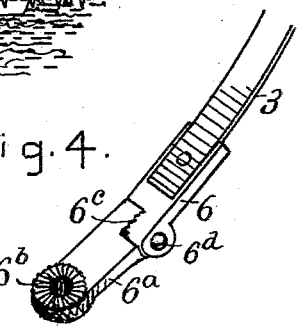
Figure 2:
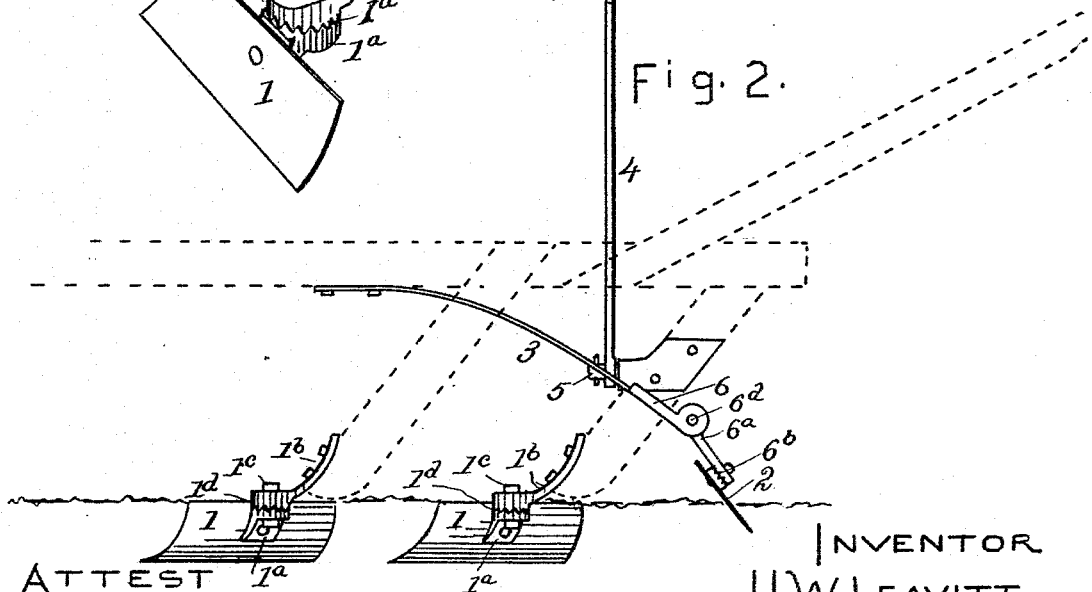

In the drawings forming part of this specification Figure 1 is a rear perspective view of a cultivator embodying my improvements. Fig. 2 is a side elevation of the different features of the invention, coacting parts of a cultivator being shown in broken lines. Fig. 3 is a perspective representation of a plow and connecting bracket. Fig. 4 is a perspective representation of the adjustable bracket that connects a leveler with its spring shank.

The plows, 1, are made of oblong sheets of metal curved to form shares, and they are secured to castings $1^a$. Brackets $1^b$ are adapted to be connected with the cultivator shanks 8 by means of bolts passing through slots in the bracket, and they have corrugated surfaces which engage corresponding corrugated surfaces of the castings, as seen at $1^d$. A bolt $1^c$ extends through coinciding holes in the casting and bracket, and binds the two together in any desired position of horizontal adjustment. The spring shanks 3 are secured to the under sides of the cultivator beams 7, they extend rearwardly between shanks 8, and they carry the levelers 2 through the intervention of the brackets 6. The levelers are formed of oblong plates toothed along their lower edges, and they have corrugated surfaces with which the corrugated ends $6^b$ of the lower portions of the brackets coact. The bracket is formed of two parts 6 and $6^a$ jointed together with intervening and corresponding corrugated surfaces, as seen at $6^c$, and such parts are held together in a manner permitting adjustment by means of bolt $6^d$. Brackets 5 are secured to the inside shanks of the cultivator and form bearings for the slotted ends of arch 4. The arch is in two parts and its lapping upper ends $4^a$ are secured together adjustably by bolts $4^b$. The plows are set at any desired angle in a horizontal plane by means of the joint between the castings and the brackets. The levelers are set at any desired angle with the vertical by means of joint $6^c$, and are tilted to any desired extent by means of joint $6^b$. The former adjustment varies the tendency of the levelers to drag the cuttings or compact the same, according as the levelers are made to stand more or less vertical, and the latter adjustment permits the cuttings to be deposited at any desired position with relation to the plants under cultivation. The arch prevents the rear ends of the beams from separating when the plows are set to throw the soil toward the row, as is generally the case, and the adjustment in the width of the arch permits a corresponding variation in the width of the space between the plows of the different beams.

A cultivator constructed or provided with my improvements will cultivate the crop, thoroughly destroy the weeds, and deposit a mulch wherever desired, without destroying the roots through which the plants draw sustenance.

Having thus described my invention, I claim as new and desire to secure by Letters Patent—

1. The combination with the beams and shanks of a straddle row cultivator, of shares as 1 secured adjustably horizontally and vertically to the shanks, spring bent bars as 3 secured to the under side of the beams and carrying adjustably secured horizontally and vertically, the toothed levelers, as 2, in the rear of the shares, and an arched frame as 4 connecting the rear ends of the beams together, substantially as set forth.

2. The combination with the beams and shanks of a straddle row cultivator, of shares, as 1, secured to the shanks in a manner permitting horizontal and vertical adjustment, spring bent bars, as 3, secured to the beams, toothed levelers, as 2, in the rear of the shares, jointed brackets, as 6 and 6ª, connecting the spring bars with the levelers, and an expansible arch frame, as 4, connecting the rear ends of the beams together, substantially as set forth.

3. In cultivators, the combination of a bent spring bar, a toothed leveler, and a jointed bracket, the bracket consisting of the part 6 secured to said spring bar and the part 6ª and connecting the bar with the leveler in a manner to permit adjustment in two directions, substantially as set forth.

In testimony whereof I sign my name in the presence of two subscribing witnesses.

HARRY W. LEAVITT.

Attest:
O. D. NOLE,
D. VANCUREN.